(12) United States Patent
Kopp

(10) Patent No.: US 7,930,942 B2
(45) Date of Patent: Apr. 26, 2011

(54) PROTECTIVE HOOD WITH A HOUSING FOR THE PROTECTION OF A MEASURING APPARATUS

(75) Inventor: Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 111 days.

(21) Appl. No.: 12/379,444

(22) Filed: Feb. 23, 2009

(65) Prior Publication Data
US 2009/0260445 A1 Oct. 22, 2009

Related U.S. Application Data

(60) Provisional application No. 61/064,855, filed on Mar. 31, 2008.

(30) Foreign Application Priority Data

Mar. 28, 2008 (EP) .................................. 08005928

(51) Int. Cl.
*G01L 7/00* (2006.01)
(52) U.S. Cl. ......................................................... 73/706
(58) Field of Classification Search .................. None
See application file for complete search history.

(56) References Cited

U.S. PATENT DOCUMENTS
7,284,428 B1 * 10/2007 Hoben et al. .................. 340/612
2007/0295728 A1 12/2007 Desmeules FOREIGN PATENT DOCUMENTS
DE          44 42 944 A1    6/1996
DE          296 12 454 U1   10/1996
* cited by examiner

*Primary Examiner* — Andre J Allen
(74) *Attorney, Agent, or Firm* — The Nath Law Group; Jerald L. Meyer; Jiaxiao Zhang

(57) ABSTRACT

The invention relates to a protective hood with a housing (1) for the protection of a measuring apparatus (2), which housing comprises a receiving space (17) for receiving a first measuring apparatus section (20) of such a measuring apparatus (2) and a through opening (12) for running a second measuring apparatus section (21) through it. The arrangement is advantageous in that at least one underlapping support element (18, 19) extends into the receiving space (17) for partially underlapping the first measuring apparatus section (20) in the direction of the through opening (12), and that the housing (1) is constructed from at least a first and a second housing section (1a, 1b) and at least one coupling element (13; 14, 15), and that the first measuring apparatus section (20) can be set between the housing sections (1a, 1b) and that the latter can be subsequently designed to be adjustable to one another for forming and closing the receiving space (17). At least one such coupling element is preferably constructed as an articulation (13) connecting housing sections (1a, 1b) to one another. Moreover, a process for mounting such a protective hood is advantageous.

11 Claims, 2 Drawing Sheets

PROTECTIVE HOOD WITH A HOUSING FOR THE PROTECTION OF A MEASURING APPARATUS

Figure 1:
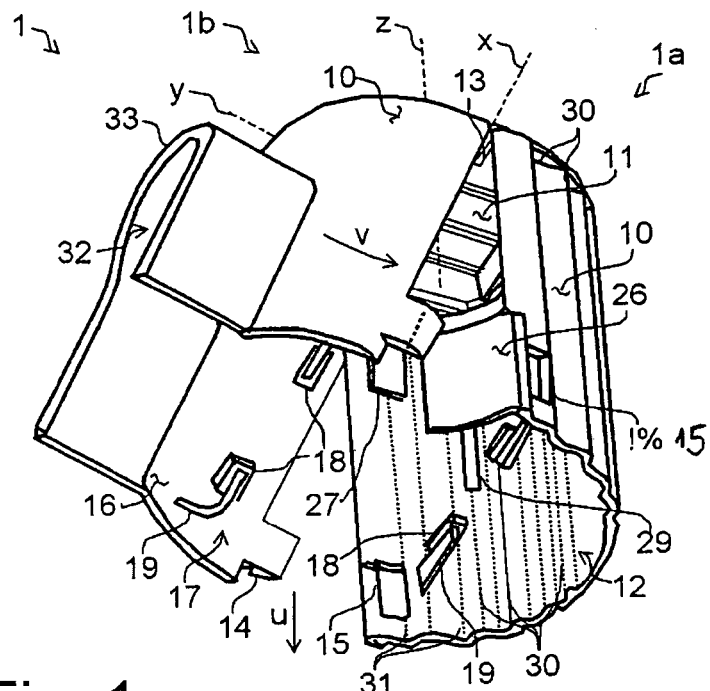

The invention relates to a protective hood with a housing for the protection of a measuring apparatus with the features of the generic part of claim 1.

Customary measuring apparatuses, in particular level- and pressure measuring apparatuses to be used on containers are constructed from several components. A first measuring apparatus section of them comprises electronic components and/or connection elements for the connection to external devices. The first measuring apparatus section is customarily arranged outside of the container whose interior space is to be monitored regarding a pressure or level. A second measuring apparatus section runs from the first measuring apparatus section to a sensor section in which appropriately designed sensor elements are received. The second measuring apparatus section is customarily constructed with a smaller circumference than the first measuring apparatus section and frequently has the form of a cylindrical tube that can be guided through a corresponding opening of the container to be monitored. Frequently, a connection section projects away from the first measuring apparatus section in lateral direction, that is, vertically to the direction of the second measuring apparatus section, through which connection section connection elements, in particular cables, are run to the outside.

The first measuring apparatus section and the connection section are optionally surrounded by a one-piece housing that offers a certain protection to the interior components against environmental influences. However, there are problems in environments with especially extreme influences such as, for example, aggressive substances, strong precipitation, especially hail, or strong solar radiation.

For an additional protection of such measuring apparatuses, protective hoods are generally known that are coordinated specifically with a corresponding housing construction form of the measuring apparatus, that is, especially with the form of the first measuring apparatus section and optionally a connection section following it. These protective hoods have the disadvantage that they do not make a use for different housing construction forms possible. The fastenings for the fastening of the protective hoods to the correspondingly associated measuring apparatuses are designed in such a manner that is it not possible to use the protective hood for different housing dimensions and thus also for other measuring apparatuses.

The invention has the problem of further developing a protective hood in such a manner that a protective function is achieved from immissions from above and possibly from the side with as few individual parts as possible. Preferably, heat being produced in the inner space, that is produced by the radiation of components of the measuring apparatus of thermal development by sunlight, can escape.

This problem is solved by a protective hood with a housing for the protection of a measuring apparatus with the features of claim 1 and by a process for mounting such a protective hood with the features of claim 10. Advantageous embodiments are subject matter of dependent claims.

Accordingly, a protective hood with a housing for the protection of a measuring apparatus is preferred. The housing comprises a receiving space for receiving a first measuring apparatus section of such a measuring apparatus and comprises a through opening for running a second measuring apparatus section through it that is connected to the first measuring apparatus section. The arrangement becomes advantageous in that at least one underlapping support element extends into the receiving space for partially underlapping the first measuring apparatus section in the direction of the through opening, and that the housing is constructed from at least a first and a second housing section and at least one coupling element, and in that the first measuring apparatus section can be set between the housing sections and that the latter can be subsequently designed to be adjustable to each other for forming and closing or locking the receiving space.

Such an arrangement of an in particular bipartite protection hood with the first and the second housing section, that can be joined together after the insertion of the first measuring apparatus section and optionally of a connection section, makes a simple mounting of the protection hood on the measuring apparatus possible. By providing one or more underlapping support elements, the corresponding projection of the first measuring apparatus section can be placed relative to the second measuring apparatus section on such underlapping support elements so that the through opening can be designed to be variable and does not obligatorily have to be dimensioned and formed itself at the same time to underlap the first measuring apparatus section in order to prevent a slipping out of the first measuring apparatus section through the through opening and/or a lifting of the protective hood. For mounting, only the first measuring apparatus section needs to be set on such support elements in one of the housing sections in order to subsequently set the other housing section on the first housing section and fix it on it.

At least one such coupling element is preferably designed as an articulation connecting the first and the second housing section to one another in an articulated manner. As a result of such a designing, a plurality of individual components does not have be kept ready but rather essentially only a single component has to be brought along for being fastened as protective hood on a measuring apparatus. An articulation already forms a first form of a coupling element, so that the two housing sections are to be connected after the closing only by a simple further coupling element in order to remain together and to enclose the first measuring apparatus section reliably in the receiving space.

A connection opening open on the bottom for running through electrically conductive connection elements of the measuring apparatus can be constructed in preferably at least one lateral circumferential wall of the first and/or of the second housing section, which connection opening is arranged open at an angle in a plane vertical to a pivot axis of the articulation. This also makes it possible to place two housing sections together around a measuring apparatus where a connection section projects from the first measuring apparatus section in a lateral direction or connection cables are run away from the first measuring apparatus section in a lateral direction. This is made possible in particular by the fact that the connection opening is open on the bottom, that is, from the viewpoint of the components of the protective hood, in the same direction as the through opening in the nature of a recess of the side wall so that the connection opening can be simply swung over exiting components like a connection section or cable.

At least one such coupling element can be designed as a catch element pair for locking the first and the second housing section on one another in an arrangement surrounding the first measuring apparatus section, so that the first measuring apparatus section can be received without further fastening components firmly in the assembled housing. However, in principle even other coupling elements can be used, optionally even only a wire, rubber or band that loop around the lower area of the lateral circumferential wall and thus firmly connect the two housing sections to one another.

At least one such underlapping support element can be designed to be elastic in such a manner that the received first measuring apparatus section is elastically tightened in the direction of an upper wall opposite the through opening and/or in the direction or opposite direction of a mounting movement. Such an elasticity in the opposite direction to the through opening has the advantage that the first measuring apparatus section can be elastically clamped between such support elements and an opposite upper wall and thus a subsequent movement of the protective hood in this direction is prevented or suppressed, aside from elastic oscillations. Moreover, even measuring apparatus sections differing in height can be set elastically tightened in the receiving space in the framework of the tolerances of the movability of the underlapping support elements in this direction. An elasticity of the underlapping support elements in a direction lateral to it, that is, in a plane transversal to the longitudinal direction of the through opening, offers advantages when assembling the housing sections, so that measuring apparatus sections with different dimensions can also be received in a simple manner.

The through opening is preferably larger than the received first measuring apparatus section and the at least one support element underlapping in such a manner is dimensioned in such a manner that the first measuring apparatus section is blocked in the direction of the through opening from exiting from the through opening yet the second measuring apparatus section can pass through the through opening. This makes a universal use possible since even measuring apparatuses with differently wide second measuring apparatus sections can be protected by such a protective hood. Frequently a protection against dust, dirt and precipitation coming from above suffices for sufficiently protecting the first measuring apparatus section with electronic components and/or cable connections. This applies in particular when the first measuring apparatus section itself actually forms a closed unit already and is only to be protected, if necessary, against massive problems due to dirt, hailstones or active solar radiation.

At least one elastic alignment element can project into the receiving space from at least one lateral circumferential wall of the first and/or of the second housing section and/or from the or an upper wall opposite the through opening for elastically tightening the received first measuring apparatus section in the receiving space. Elastic alignment elements are especially advantageous for bringing the protective hood and/or the housing into a fixed position relative to the received measuring apparatus section and for preventing a wobbling. Furthermore, a spacing between external walls of the first measuring apparatus section and an inner side of the housing is left by such alignment elements which spacing can be designed for making possible a flow of air and therewith a removal of heat.

Such elastic alignment elements are advantageously provided in such a manner that the first measuring apparatus section and optionally also a connection section set on it abut from preferably all directions against at least one such elastic alignment element. However, even a construction in which only one individual elastic alignment element is provided is possible in principle that presses the received first measuring apparatus section against an opposite, rigid housing wall of the housing and thus elastically presses it inside the housing into a given position. In any case a stable mounting of protective hood and of measuring apparatus relative to one another is made possible independently of the dimension and shaping of the first measuring apparatus section. Thus, when used outdoors, e.g., even a clapping sound in wind is avoided.

Rebounding wall sections are preferably constructed in the or a lateral circumferential wall of the first and/or of the second housing section which lateral circumferential wall connects the or an upper wall opposite the through opening in the direction of the lower through opening in the mounted state during the operation of the measuring apparatus. Such a wall structuring of the lateral circumferential wall forms conduits through which heated air can be transported away. A corrugated wall is especially preferred here that consists of corrugated, rebounding and projecting wall sections that merge into each other and offers an elevated wall stability at the same time in addition to the formation of air conduction conduits.

A ventilation opening for ventilating the receiving space can be constructed in at least one such wall section that springs back, viewed from the outside, into the receiving space. In as far as the penetration of excessive dirt, water or other immissions can be excluded or only takes place to a negligible extent on account of the arrangement by lateral openings, such lateral ventilation openings are preferably provided in order to be able to remove heat from the interior of the receiving housing to the outside.

According to the process, it is preferred for mounting a protective hood around a first measuring apparatus section of a measuring apparatus, especially for mounting a protective hood preferably constructed in such a manner, if a first measuring apparatus section of such a measuring apparatus is set in a receiving space of a housing of the protective hood in such a manner that a second measuring apparatus section is run out of the housing through a through opening, in which the first measuring apparatus section is set on at least one support element projecting into the receiving space and underlapping the first measuring apparatus section, and subsequently at least one second housing section is set against the first measuring apparatus section and is locked on the first housing section in such a manner that the receiving space with the inserted first measuring apparatus section is surrounded by them.

The at least one elastic alignment element can be elastically tightened against the first measuring apparatus section when the second housing section is set on the first housing section for elastically tightening the received first measuring apparatus section in the receiving space if at least one elastic alignment element projects into the receiving space from at least one lateral circumferential wall of the first and/or of the second housing section and/or from the or an upper wall opposite the through opening.

The underlapping support elements and alignment elements can advantageously be arranged with spacing and upwardly offset on the inside of the lateral wall of their lower edge so that a desired distance from penetrating dirt or water is ensured even from below.

Thus, protective hoods can be constructed that achieve a protective function from immissions from above and from the side with few individual parts and are designed in such a manner that heat produced in the interior can escape by radiation of the measuring apparatus or by thermal development by sunlight. Such protective hoods can be fastened to sensor housings with different connection diameters and dimensioning by spring flaps and/or centering flaps designed as underlapping support elements and alignment elements in the housing sections, that preferably have a half-shell shape. Set-back ventilation slits in the form of ventilation openings permit a drawing off of the heated air without contaminations being able to directly penetrate from above. In the case of an in particular bipartite protective hood with a flap designed around the articulation a protection against a lifting off of the hood is achieved by resilient flaps supported on the neck of the measuring apparatus or on the second measuring apparatus section, which flaps are in the form of support elements that are elastic in the lateral direction. A protection against a penetration by contaminants from above can be achieved in particular by undercuts in one of the hood halves. Such protective hoods can be used in particular for a chamber housing of measuring apparatuses manufactured from plastic, high-grade steel or aluminum. The protective hoods themselves are preferably manufactured from plastic, in particular injection-molded plastic, but can also be manufactured from other materials or different types of combined materials.

An exemplary embodiment is explained in detail in the following using the drawings of two embodiments.

Figure 2A:
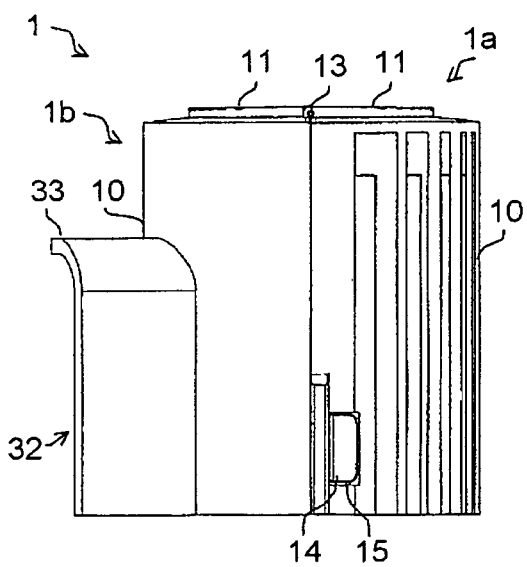
Figure 2B:
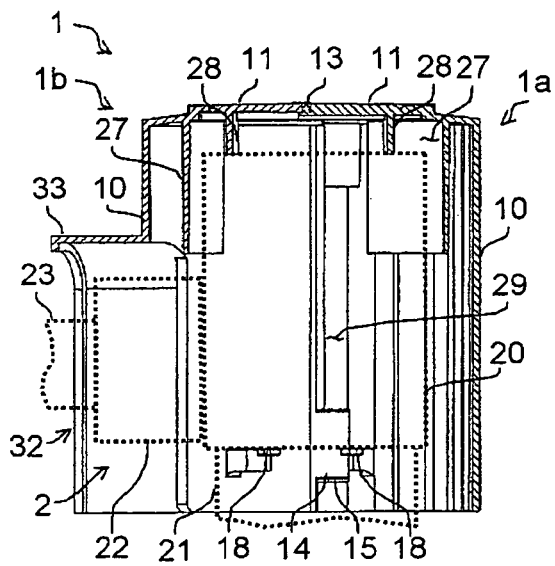
Figure 3:
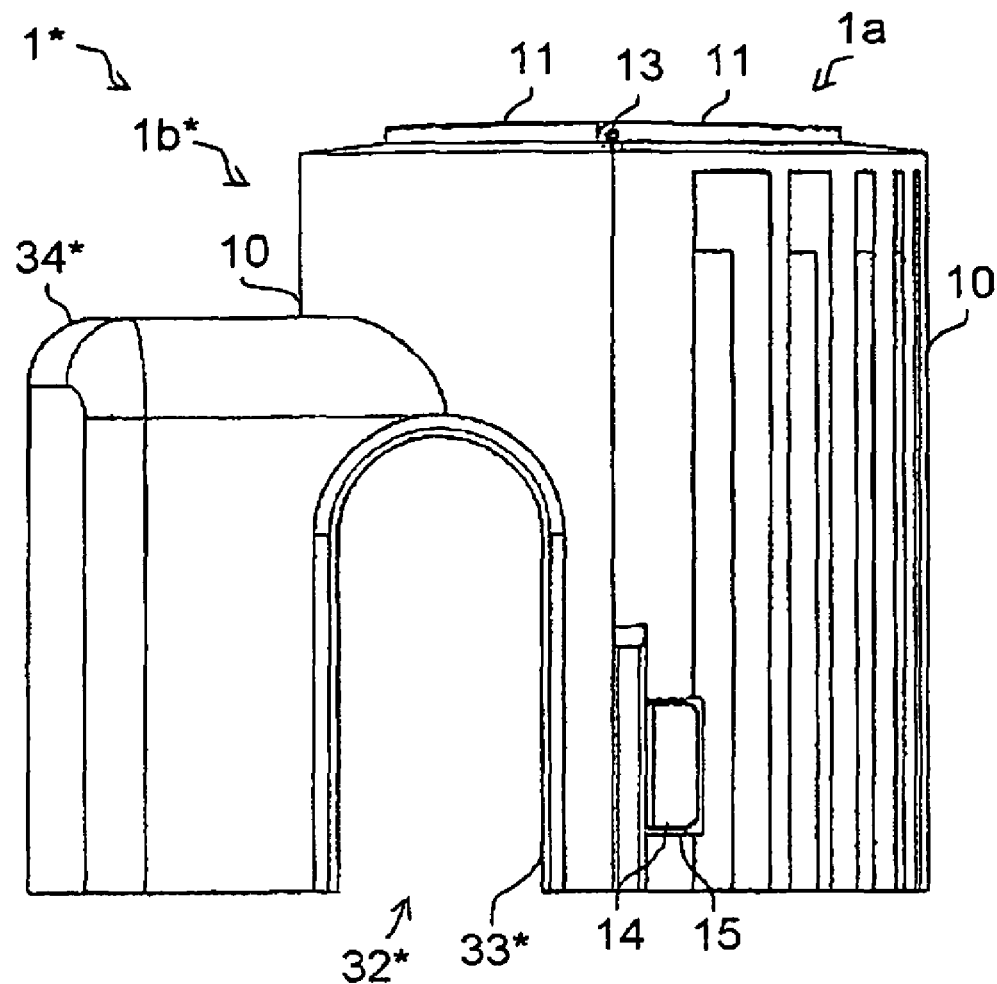

FIG. 1 shows a preferred protective hood in a perspective view obliquely from below, FIG. 2A shows such a protective hood in a side view, FIG. 2B shows this protective hood in a sectional view with a received measuring apparatus shown in dotted lines, and FIG. 3 shows an alternative embodiment of such a protective hood in a side view.

As can be seen from FIGS. 1, 2A and 2B, an especially preferred protective hood with a housing 1 for protecting a measuring apparatus 2 preferably consists of a first housing section 1a and a second housing section 1b that can be connected or coupled to one another by coupling elements. In assembled form the housing 1 consists substantially of a lateral circumferential wall 10 and an upper wall 11 as well as of a lower or bottom through opening 12 opposite upper wall 11. Housing 1 thus has substantially the form of a bucket turned upside down. The subdivision into the two housing sections 1a, 1b preferably takes place in such a manner that a halving of housing 1 is performed axially parallel to a longitudinal axis z running vertically through through opening 12 and upper wall 11. This forms two lateral circumferential walls 10 extending over substantially a semicircle and each with an upper wall 11 closed over a semicircular surface.

The two housing sections 1a, 1b are connected in an articulated manner about a pivot axis x in accordance with an especially preferred embodiment via an articulation arrangement with at least one articulation 13 as a first coupling element. The pivot axis x or the articulation 13 connects the two edges, that contact one another, of the two top walls 11 to one another so that the two housing sections 1a, 1b can be folded open and closed relative to one another about the pivot axis x.

In order to couple and lock the two housing sections 1a, 1b in the closed state of housing 1, further coupling elements 14, 15 are preferably provided on them. These further coupling elements are formed especially preferably by a catch element pair or by several catch element pairs. As shown, preferred catch element pairs consist of a catch element 14 and of a catch recess 15 formed for the engagement of catch element 14. Catch element recess 15 is designed as a recess or through opening in lateral circumferential wall 10 in preferably one section in the vicinity of the lower through opening and adjacent to the adjoining edge, which is the opposite one in the closed state, of the lateral circumferential wall 10 of the other one of the housing sections 1a. Accordingly, on the opposite lateral circumferential wall 10 of the other housing section 1b the catch element 14 corresponding to the catch recess 15 is constructed in such a manner that it projects from the edge of lateral circumferential wall 10 in a lateral direction and can be guided adjacent to the outer or inner surface of lateral circumferential wall 10 of the other housing section 1a over catch recess 15 in order engage in it. Thus, the catch elements 14 are guided over the catch recess is 15 in order to engage in them by pivoting the preferably second housing section 1b about pivot axis x in a pivoting direction v.

A receiving space 17 designed for the receiving 20 of measuring apparatus 2 to be set in is surrounded by the insides of the two lateral circumferential wall 10 in the assembled state of housing 1. As is sketched in particular in FIG. 2B, a second measuring apparatus section 21 extends away from first measuring apparatus section 20 in the lower direction, and the second measuring apparatus section 21 comprises at least partially a smaller outer circumference than first measuring apparatus section 20. As a consequence, first measuring apparatus section 20 has sections or projections that project relative to second measuring apparatus section 21 on the bottom. According to an especially preferred embodiment of measuring apparatus 2 it furthermore has a connection section 22 in a lateral direction that runs for introducing a connection element 23, in particular a cable, in a lateral direction from first measuring apparatus 20. Accordingly, first measuring apparatus section 20 and also connection section 22 should preferably be covered and laterally surrounded by the protection hood. On the other hand, in the assembled state the second measuring apparatus section 21, that runs to a sensor section with sensors, should run out of the bottom through opening 12.

In order to be able to protect the largest possible plurality of measuring apparatuses 2 with this protective hood, receiving space 17 is dimensioned to be as large as possible. In order that even measuring apparatuses 2 with a first measuring apparatus section 20 dimensioned smaller than receiving space 17 can be reliably received in housing 1, appropriate locking means are constructed on the inside of receiving space 17.

Underlapping support elements project from the inside 16 of lateral circumferential wall 10 as first locking elements into receiving space 17 on or preferably not too far distanced from the bottom through opening 12. The underlapping support elements preferably consist of an actual support element 18 and a fastening element 19 that connect the support elements 18 to lateral circumferential wall 10. However, in principle even one-piece support elements can be provided that project directly from lateral circumferential wall 10 into receiving space 17.

Support elements 18 are preferably constructed with an areal surface facing upper walls 11. An embodiment consisting of an elastic material makes possible an elastic supporting of first measuring apparatus section 20 on support elements 18 after the projections sections or projections of the first measuring apparatus section 20 have been set on.

For assembly, the two housing sections 1a, 1b are pivoted apart in order to set first measuring apparatus section 20 on correspondingly one or several of the underlapping support elements, that is, support elements 18 and fastening elements 19, which latter are arranged in receiving space 17 in such a manner that the second measuring apparatus section 21 can pass by them and exit out of through opening 12. Subsequently, the second housing section 1b is pivoted against the first housing section 1 in order to close housing 1 during which such underlapping support elements, that is, support elements 18 and fastening elements 19, located in second housing section 1b are also set under correspondingly arranged lateral projections of first measuring apparatus section 20. As a result thereof, after the closing of housing 1 the first measuring apparatus section 20 is firmly received in housing 1 in the direction of longitudinal axis z and can not exit like second measuring apparatus section 21 through bottom through opening 12.

Optionally, the underlapping support elements, in particular their elastic fastening elements 19, can also be elastically adjusted in the direction of longitudinal axis z and/or in a lateral direction, that is, in a plane vertical to longitudinal axis z. In particular, a lateral bending of fastening elements 19 in second housing section 1b in the second housing section 1b to be pivoted close has the advantage that they are pressed, if necessary, in the case of a second measuring apparatus section 21, that is dimensioned to be relatively large, laterally against its circumferential wall but do not prevent a complete closing of housing 1 or a pivoting of second housing section 1b close to first housing section 1a on account of their resilience. A possible elasticity in the direction of longitudinal axis z can be utilized to elastically clamp the first measuring apparatus section 20 in the direction of the upper walls 11.

In order to fix first measuring apparatus section 20 inside receiving space 17 as adjustment-proof as possible relative to housing 1, preferably one or several alignment elements 26, 27, 28 project from lateral circumferential walls 10 or upper walls 11 into receiving space 17. The elasticity of such alignment elements 26-28 is selected in such a manner that a measuring apparatus section 20 that is dimensioned to be very large presses them during the closing of housing 1 preferably all the way against the walls or, if necessary, can even press them together; on the other hand, a measuring apparatus section 20 that is dimensioned to be very small is held with sufficient tightening force as adjustment-proof as possible to the inside 16 of lateral circumferential walls 10.

A first alignment element 26 is especially advantageous here that extends transversely to the direction of insertion of first measuring apparatus section 20, that is, with an extension component parallel to longitudinal axis z, into receiving space 17. Such an alignment element 26 has the result that first measuring apparatus section 20 is tightened against an opposite wall of second housing section 1b during insertion already and is thus held in direction of pivoting vertically in an adjustment-proof manner in receiving space 17. Preferably, however, one or several further such alignment elements 28 are run from lateral circumferential wall 10 or preferably from upper wall 11 into receiving space 17 in such a manner that they also make possible a fixing of the inserted measuring apparatus section 20 in an adjustment direction transversely and laterally to direction of pivoting v. Moreover, upper alignment elements 27 can be constructed as elastic abutments to the underlapping support elements or support elements 18 and thus also fix an inserted measuring apparatus section 20 in the direction of longitudinal axis z.

In embodiments of protective hoods provided for being used on measuring apparatuses that are adversely affected only conditionally by lateral immissions, one or several ventilation openings 29 are formed preferably in lateral circumferential wall 10. They are advantageously located in particular in the upper section of lateral circumferential wall 10, so that heat being produced in receiving space 17 can exit through ventilation openings 29.

An embodiment is especially preferable in which the corresponding lateral circumferential wall 10 comprises projecting wall sections 30 and rebounding wall sections 31, so that ventilation openings 29 are protected from imissions from the direction of the top in an arrangement in the area of rebounding wall sections 31 by a section, overlapping like a canopy, of upper wall 11.

In the embodiment shown a lateral circumferential wall 10 of first housing section 1a is structured in corrugations. However, even other structurings, optionally even conduit-shaped structures constructed with edges can be constructed in the direction axially parallel to longitudinal axis z in lateral circumferential wall 10 in order to form rebounding wall sections.

In order to be able to run connection elements 23, especially cables, from the first measuring apparatus section 20 or, as sketched, from connection section 22 to the outside in a lateral direction, a lateral connection opening 32 is formed in preferably the second housing section 1b. The connection opening is advantageously open in the bottom direction so that when second housing section 1b is pivoted about pivot axis x the connection opening 32 can be simply pivoted over the laterally projecting connection element 23. Connection opening 32 is thus arranged in lateral circumferential wall 10 preferably in a direction y vertical to the plane of pivot axis x and of longitudinal axis z. In an embodiment for a measuring apparatus with such a connection section 22 the actual connection opening 32 is preferably shifted outward in a lateral direction by the formation of a connection opening wall 33 projecting laterally outward from lateral circumferential wall 10. In case of a danger from lateral immission, such a connection opening wall 33 can also extend beyond the length of possible connection sections 22 in order to form a type of projecting canopy.

FIG. 3 shows an alternative embodiment of such a protective hood. However, in contrast to the embodiment according to FIG. 1, housing 1* has a modified design of the second housing section 1b*. To the extent that the same reference numerals are used as in the previous embodiment, they refer to the same components or components that operate in the same manner, for which reason the previous description is referred to in this regard. Reference numerals characterized with an "*" refer to components that are modified in comparison to the first embodiment.

In this alternative embodiment the second housing section 1b* has a space that projects from it in a lateral direction and substantially upward and closed on the lateral sides transversely to longitudinal axis z, which space is constructed for receiving the connection section of the measuring apparatus in such a manner that it encloses it on all sides. In the sketched embodiment a start is made from a connection section in which the connection element is not run out of house 1* in an extended direction from the viewpoint of the first measuring apparatus section via the connection section in an outside direction but rather has run out of house 1* in a direction that is lateral to the connection section. In a corresponding manner, a connection opening 32* with a connection opening wall 33* that preferably surrounds it is formed in a direction lateral to the receiving space 34* for the connection section. Thus, in principle such a connection opening can be formed, depending on the design, at any location on lateral circumferential walls 10. In such an instance the first measuring apparatus section can optionally be set together with the connection section during assembly into the second housing section on its underlapping support elements in order to then pivot the first housing section 1a against the second housing section 1b so that the connection element can be run through the connection opening 32* in the first step already.

The invention claimed is:

1. A protective hood with a housing for the protection of a measuring apparatus, which housing comprises
    a receiving space for receiving a first measuring apparatus section of such a measuring apparatus and
    a through opening for running a second measuring apparatus section through it that is connected to the first measuring apparatus section, characterized in that
    at least one underlapping support element extends into the receiving space for partially underlapping the first measuring apparatus section in the direction of the through opening, and that the housing is constructed from at least a first and a second housing section and at least one coupling element, and that the first measuring apparatus section is arranged between the housing sections and that the latter is designed to be adjustable to each other for forming and closing or locking the receiving space.

2. The protective hood according to claim 1, in which at least one such coupling element is designed as an articulation connecting the first and the second housing sections in an articulated manner to one another.

3. The protective hood according to claim 2, in which a connection opening open on the bottom and the side for running through electrically conductive connection elements of the measuring apparatus is formed in the at least one lateral circumferential wall of the first and/or of the second housing section, which connection opening is arranged open at an angle in a plane vertical to a pivot axis (x) of the articulation.

4. The protective hood according to claim 1, in which at least one such coupling element is designed as a catch element pair for locking the first and the second housing section on one another in an arrangement surrounding the first measuring apparatus section.

5. The protective hood according to claim 1, in which at least one such underlapping support element is designed to be elastic in such a manner that the received first measuring apparatus section is elastically tightened in the direction of an upper wall opposite the through opening and/or in the direction or opposite direction of a mounting movement.

6. The protective hood according to claim 1, in which the through opening is larger than the received first measuring apparatus section and the at least one support element underlapping in such a manner is dimensioned in such a manner that it blocks the first measuring apparatus section in the direction of the through opening from exiting out of the through opening and allows the second measuring apparatus section to pass through the through opening.

7. The protective hood according to claim 1, in which at least one elastic alignment element projects into the receiving space from at least one lateral circumferential wall of the first and/or of the second housing section and/or from the or an upper wall opposite the through opening for elastically tightening the received first measuring apparatus section in the receiving space.

8. The protective hood according to claim 1, in which rebounding wall sections are constructed in the or a lateral circumferential wall of the first and/or of the second housing section, which lateral circumferential wall connects the or an upper wall opposite the through opening in the direction of the lower through opening in the mounted state during the operation of the measuring apparatus.

9. The protective hood according to claim 8, in which a ventilation opening for ventilating the receiving space is constructed in at least one such wall section that springs back, viewed from the outside, into the receiving space.

10. A process for mounting a protective hood around a first measuring apparatus section of a measuring apparatus, especially for mounting a protective hood in accordance with a previous claim, in which
    a first measuring apparatus section of such a measuring apparatus is set in a receiving space of a housing of the protective hood in such a manner that a second measuring apparatus section is run out of the housing through a through opening, characterized in that
    the first measuring apparatus section is set on at least one support element projecting into the receiving space and underlapping the first measuring apparatus section, and
    subsequently at least one second housing section is set against the first measuring apparatus section and is locked on the first housing section in such a manner that the receiving space with the inserted first measuring apparatus section is surrounded by them.

11. The process according to claim 10, in which
    at least one elastic alignment element projects into the receiving space from at least one lateral circumferential wall of the first and/or of the second housing section and/or from the or an upper wall opposite the through opening, and
    the at least one elastic alignment element is elastically tightened against the first measuring apparatus section when the second housing section is set on the first housing section for elastically tightening the received first measuring apparatus section in the receiving space.

* * * * *